United States Patent [19]
Piffath et al.

[11] 3,800,979
[45] Apr. 2, 1974

[54] LPG VALVE ASSEMBLY

[75] Inventors: Rodney S. Piffath, Northridge; John J. Cole, Beverly Hills, both of Calif.

[73] Assignee: International Fire Tool Corporation, New York, N.Y.

[22] Filed: Dec. 29, 1971

[21] Appl. No.: 214,996

[52] U.S. Cl. ............... 220/89 A, 137/322, 137/467, 137/DIG. 2, 220/44 B, 222/3, 222/396, 251/353
[51] Int. Cl. ..... B65d 25/00, B65d 7/24, B65d 51/16
[58] Field of Search ........... 220/89 A, 44 B; 74/537; 251/353, 216, 264, 349; 137/322, 323, DIG. 2, 67, 467; 141/295; 222/3, 396, 386, 386 S, 81, 49 S

[56] References Cited
UNITED STATES PATENTS

| | | | |
|---|---|---|---|
| 2,912,173 | 11/1959 | Edwards | 251/353 |
| 542,795 | 7/1895 | Cary | 251/353 |
| 2,998,024 | 8/1961 | Marette et al. | 137/625.27 |
| 3,224,455 | 12/1965 | Acfieri | 137/113 |
| 1,275,783 | 8/1918 | Steinmetz | 137/DIG. 2 |
| 3,498,313 | 3/1970 | Belich | 137/322 |
| 3,285,274 | 11/1966 | Bouvier | 137/322 |
| 3,613,728 | 10/1972 | Steiman | 251/353 |
| 3,187,962 | 6/1965 | Meshberg | 251/353 |
| 3,552,421 | 1/1971 | Yocum | 251/216 |
| 3,512,754 | 5/1970 | Zaino | 251/353 |
| 3,174,519 | 3/1965 | Pizzurro et al. | 251/353 |
| 3,353,724 | 11/1967 | Johnston | 137/322 |
| 3,315,693 | 4/1967 | Braun | 251/353 |
| 1,334,566 | 3/1920 | Steinmetz | 251/353 |
| 2,664,266 | 12/1953 | Johnson | 251/353 |
| 2,619,982 | 12/1952 | Turner | 137/67 |

FOREIGN PATENTS OR APPLICATIONS

| | | | |
|---|---|---|---|
| 1,293,911 | 4/1962 | France | 251/360 |

*Primary Examiner*—George E. Lowrance
*Assistant Examiner*—Allan N. Shoap
*Attorney, Agent, or Firm*—Lyon & Lyon

[57] ABSTRACT

A conventional pressure can has a top end wall with a central aperture and a stationary tubular body fixed to the end wall and projecting axially into the interior of the can. A central threaded opening in the body communicates with the aperture and with the bore of an axial elastomeric sleeve fixed within the body. A metallic piston of cylindrical shape and rounded ends is received within the bore of the elastomeric sleeve between the ends thereof and the diameter of the cylindrical piston is greater than the normal free diameter of the bore, so that the piston prevents escape of LPG fuel from the can under normal pressure conditions but blows out through the body opening and can top aperture in the event of buildup of excessive pressure within the can due to heat. An outlet unit having external threads engaging internal threads within the body is insertable through the cap top aperture, and this outlet unit carries an axially extending projection capable of axially displacing the piston from the bore of the elastomeric sleeve into a stationary retainer tube on the body. The projection seals within the bore of the elastomeric sleeve and has a flow control side port communicating with a central axial discharge passage so that turning movement of the outlet unit relative to the can and body may expose the port below the lower end of the elastomeric sleeve in a controlled manner to regulate the flow rate through the discharge passage. Upon axial removal of the outlet unit from the body, the piston is seated by gas pressure against the lower end of the elastomeric sleeve to act as a check valve preventing escape of gas from the can. A hollow refill probe may be axially inserted through the can top aperture and body opening to displace the piston from sealing position to refill the can to the desired level, and upon removal of the probe the piston is returned by gas pressure to seal against the lower end of the elastomeric sleeve.

7 Claims, 12 Drawing Figures

LPG VALVE ASSEMBLY

This invention relates to a valve assembly for a LPG container and is particularly directed to a multiple purpose device which acts first as a safety plug to prevent escape of LPG from the can until the can is ready for use but which will blow out under excessive pressure caused by heat to prevent an explosion of the can; second, to regulate the flow of gas from the can when it is in use; third, to act as a check valve to prevent escape of LPG from the can when use of the can is temporarily discontinued; and fourth, to permit refill of the can through a hollow probe when the LPG contents have been depleted and to seal against gas escape until the can is to be used again. These operating characteristics of the valve assembly are highly desirable for use with a conventional pressure can of standard dimensions for use as a fuel supply for stoves, lanterns, lighters, heaters, etc.

A conventional pressure can of standard dimensions available in quantity at low cost has a conventional pressure-tight spun joint with an end wall which comprises the can top. In accordance with this invention, the can top is provided with a central aperture and an aligned axially extending body fixed to the can top and extending axially into the can. The body is tubular and is aligned with the aperture. After initial filling of the can with LPG by conventional apparatus, a cylindrical piston with rounded ends is inserted into the body and into the axial bore of an elastomeric sleeve fixed in the body. The diameter of the cylindrical piston is greater than the normal free diameter of the bore in the elastomeric sleeve so that the piston is gripped between the ends of the elastomeric sleeve to prevent escape of LPG from the can under normal pressure conditions. Should the can become overheated for any reason, the increased pressure of the LPG forces the piston out of the elastomeric sleeve and out through the can top aperture to permit discharge of the LPG and to prevent explosion of the can.

When the can and contents are to be used with a stove, lantern, lighter, heater, etc., an outlet unit is inserted axially through the can top aperture into threaded engagement with the internal body. A cylindrical projection on the outlet unit mechanically displaces the piston from its sealed position and moves it out of the elastomeric sleeve into a stationary retainer tube, whereupon the cylindrical projection of the outlet unit seals within the bore of the elastomer sleeve. Turning movement of the outlet unit and projection with respect to the body along the threaded connection exposes a side port in the projection to permit flow of LPG through the side port and into a central discharge passage in the outlet unit leading to the device which is to consume the LPG fuel.

Disassembly of the outlet unit from the pressure can and internal body causes internal pressure to move the piston to seat against the lower end of the elastomeric sleeve to provide a check valve against escape of LPG until the can is to be placed in use again. The piston is readily displaced by a conventional hollow refill probe so that the contents of the can can be replenished when needed. After completion of the refill operation, the piston resumes its function as a check valve to prevent escape of LPG unti the can is to be used again.

Other and more detailed objects and advantages will appear hereinafter.

Figure 1:
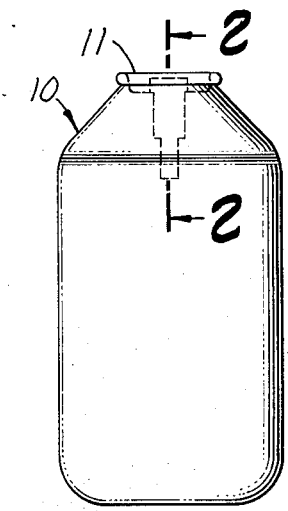
FIG. 1 is a side elevation showing a preferred embodiment of this invention.
Figure 6:
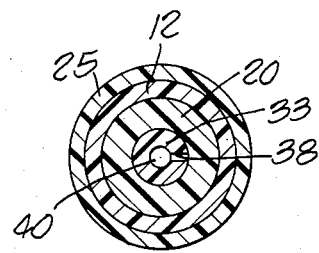
FIG. 6 and FIG. 7 are sectional details taken substantially on the lines 6—6 and 7—7, respectively, as shown in FIG. 3.

Referring to the drawings, a conventional metallic pressure can 10 is provided with an end wall 11 which forms the can top. The can top 11 is fixed to the pressure can by means of a conventional spun joint 9. A stationary tubular body 12 is fixed to the end wall 11 in alignment with the central aperture 13 and projects into the interior of the pressure can 10. A shoulder 15 on the body is clamped between the crimped portion 16 of the end wall 11 and the flange 17, and a sealing washer 18 is clamped between the body shoulder 15 and the flange 17. The stationary body 12 is provided with internal threads 14. An elastomeric sleeve 20 having a central axial bore 21 is contained within the body bore 22 between the shoulder 23 and the shoulder 24. The shoulder 24 is provided by the retainer tube 25 having a press fit connection 26 with the body 12. The body 12 and retainer tube 25 function as a single integral unit.

A cylindrical piston 28 having rounded ends is mechanically installed within the bore 21 of the elastomeric sleeve 20 and between the ends of the sleeve 20 after the pressure can 10 is initially filled with LPG. This initial filling is accomplished by conventional means. The diameter of the cylindrical piston 28 is greater than the initial free diameter of the bore 21 of the elastomeric sleeve 20, so that the piston is resiliently gripped within the bore 21. The parts are then in the position shown in FIG. 2. In this position, the pressure can is sealed against escape of LPG under normal operating pressures. Should the internal pressure in the can rise beyond a predetermined maximum, such as would be occasioned by subjecting the can to excessive temperatures, the piston 28 is blown out of the bore 21 and out through the threaded opening 14 and through the can top aperture 13, permitting escape of the LPG contents of the can, and thereby avoiding an explosion of the can.

Figure 2:
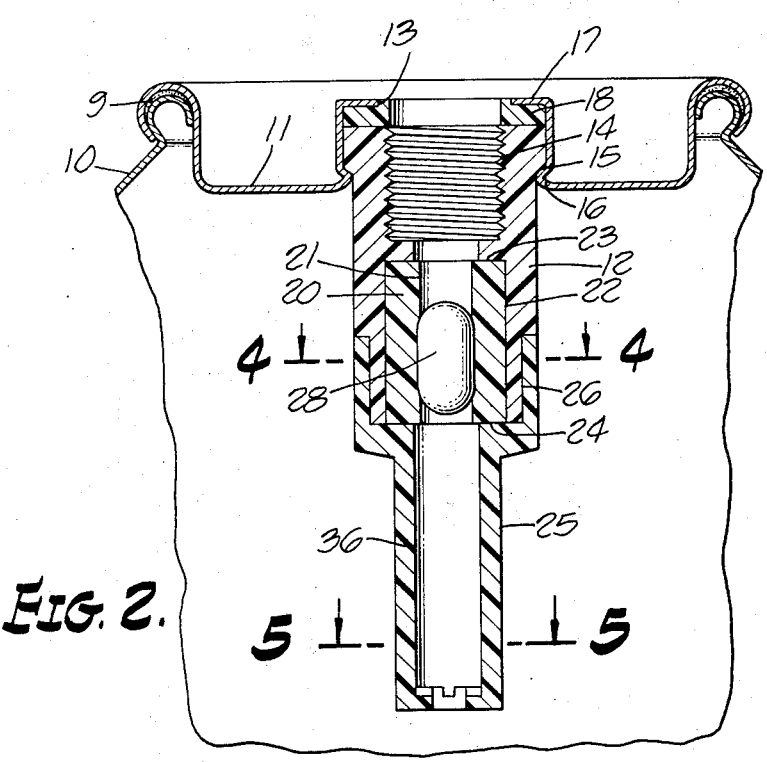
FIG. 2 is a sectional elevation taken substantially on the lines 2—2 as shown in FIG. 1.
Figure 7:
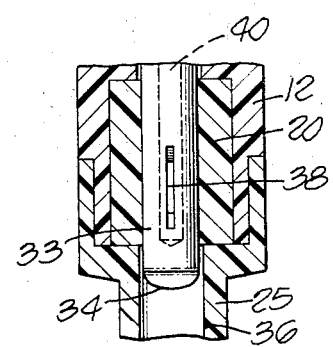

The piston 28 remains in the sealed position shown in FIG. 2 until the pressure can 10 is used to supply fuel to an external fuel-consuming device. The pressure can may be safely stored or transported without danger of escape of LPG unless excessive temperature conditions are encountered, and in the latter event an explosion of the can is prevented by blowout of the piston 28. During this period prior to the time of desired use of the fuel from the can, nothing projects from the can top which might be broken off or damaged.

In order to connect the pressure can for delivery of LPG to an external fuel-consuming device (not shown), an outlet unit generally designated 31 is axially inserted into the can top aperture and threaded opening 14 in the body 12.

Figure 3:
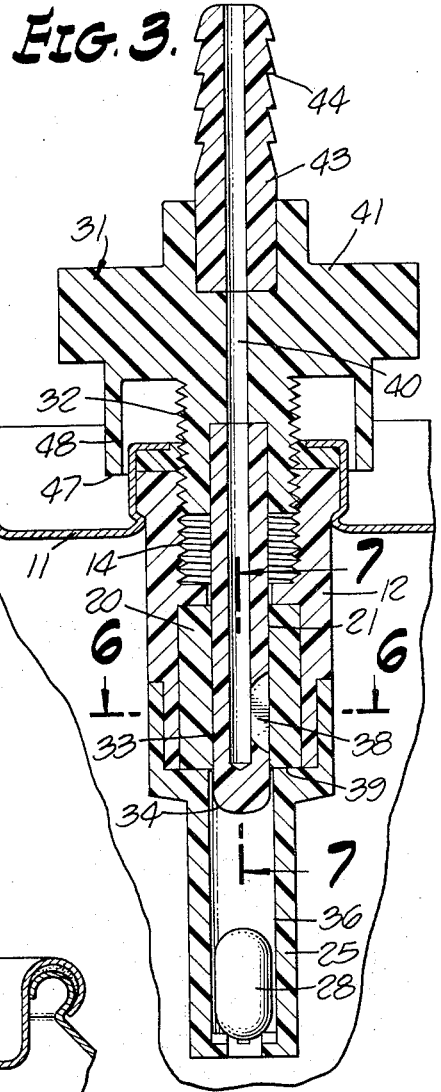
FIG. 3 is a sectional view similar to FIG. 2, showing the installation of the outlet unit.
Figure 4:
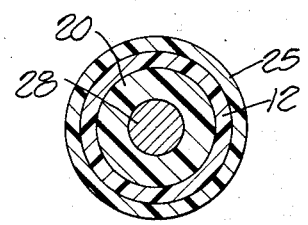
FIG. 4 and FIG. 5 are transverse sectional details taken substantially on the lines 4—4 and 5—5, respectively, as shown in FIG. 2.
Figure 5:
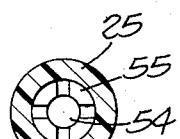

As shown in FIG. 3, the outlet unit 31 is provided with external threads 32 which engage the internal threads 14 of the stationary body 12. A smooth cylindrical projection 33 on the outlet unit 31 extends into the bore 21 and upon turning movement of the outlet unit 31 with respect to the pressure can 10 and body 12, the rounded end 34 of the projection contacts the piston 28 and mechanically moves it out of the bore 21 of the elastomeric sleeve 20 and into the bore 36 of the retainer tube 25. This bore 36 is of larger diameter than the diameter of the cylindrical piston 28, so that gas may pass between the piston 28 and the bore 36. The outer cylindrical surface of the projection 33 forms a seal within the bore 21 of the elastomeric sleeve 20 to prevent flow of gas from the interior of the pressure can. The parts are then in the position shown in FIG. 3.

Continued turning movement of the outlet unit 31 with respect to the pressure can 10 along the threads 14, 32, causes the lower end of a narrow axially extending slot 38 to project below the lower end 39 of the elastomeric sleeve 20. This slot 38 may be formed by a very narrow sawcut which intersects the central axial discharge passage 40 in the projection 33 and head 41 of the outlet unit 31. A discharge tube 43 pressed into the head 41 comprises a continuation of the outlet passage 40. Conventional external rings 44 on the outlet tube 43 provide a connection for a discharge hose leading to a fuel-consuming device (not shown).

Figure 8:
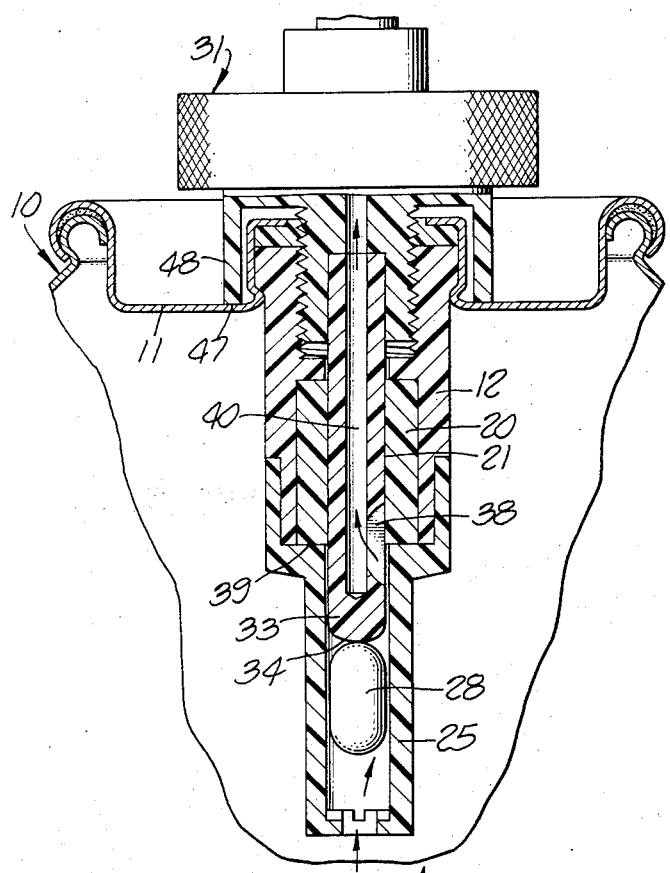
FIG. 8 is a view similar to FIG. 3 but showing the parts in an operating position in which gas under pressure is being discharged from the pressure can.

The flow rate through the discharge passage 40 is accurately regulated by turning of the head 41 of the outlet unit 31 to expose the lower end of the slot 38 below the elastomeric sleeve 20 in a controlled manner. Maximum exposure of the slot 38 occurs when the lower end 47 of the skirt 48 on the head 41 contacts the top end wall 11 of the pressure can 10, as shown in FIG. 8.

Figure 10:
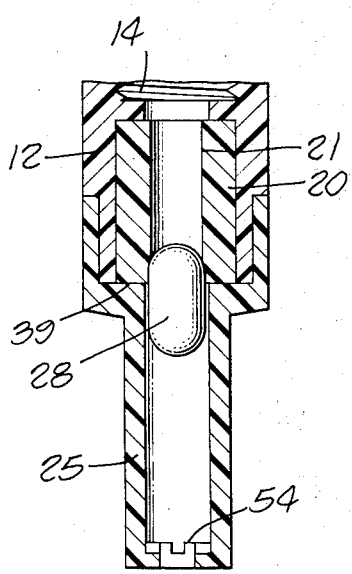
FIG. 10 is a sectional detail showing the position of the parts after withdrawal of the refill apparatus, and showing the piston in sealing position within the lower end of the bore of the elastomeric sleeve.

Removal of the outlet unit 31 causes the piston 28 to be moved by pressure and velocity of the gas into sealing position at the lower end 39 of the elastomeric sleeve 20, as shown in FIG. 10. The normal operating pressures within the pressure can 10 are not sufficient to move the piston 28 completely into the bore 21. However, if excessive pressures should occur because of heat, such excessive pressures propel the piston 28 through the bore 21 and out through the aperture 13, to prevent explosion of the can.

Figure 9:
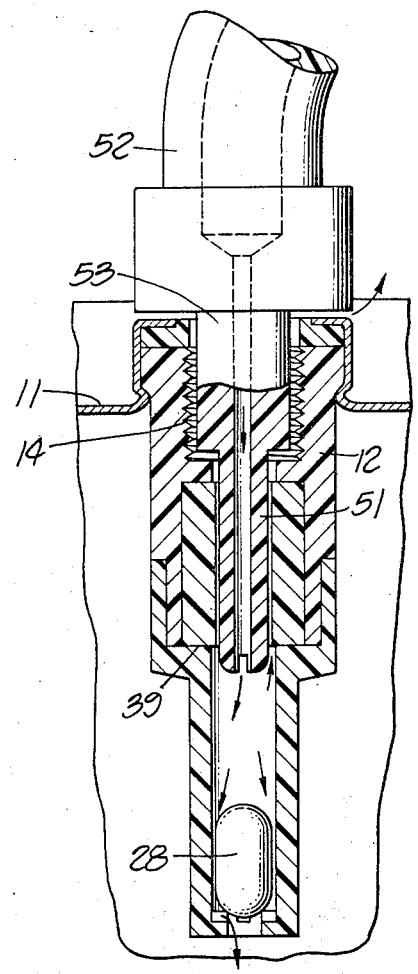
FIG. 9 is a view similar to FIG. 2 showing the operation of refilling the pressure can with LPG.

As shown in FIG. 9, the pressure can 10 may be refilled using a conventional hollow probe 51 carried on the end of a filler hose 52. An enlarged portion 53 of the hollow probe 51 is smooth and is loosely received within the threaded opening 14 of the body 12. The cylindrical piston 28 is displaced from sealing position at the end 39 of the elastomeric sleeve 20, either mechanically by the end of the probe 51 or by pressure of the fluid in the interior of the hollow probe. The piston 28 moves to the lower end of the retainer tube 25 but is prevented from passing out of the tube into the interior of the can by means of the stop 54 at the end of the tube 25. Ports 55 in the stop 54 permit the flow of LPG in either direction through the stop 54. During the filling operation, vapors escape through the clearance space between the body threads 14 and the enlarged portion of the probe 53. Upon completion of the filling operation, the filling probe 51 is axially withdrawn and the piston 28 returns to seat against the lower end 39 of the elastomeric sleeve 20, as shown in FIG. 10. If desired, a coil compression spring might be mounted on the stop 54 within the retainer tube to supplement the pressure force holding the piston 28 against the end 39 of the elastomeric sleeve 20.

Figure 11:
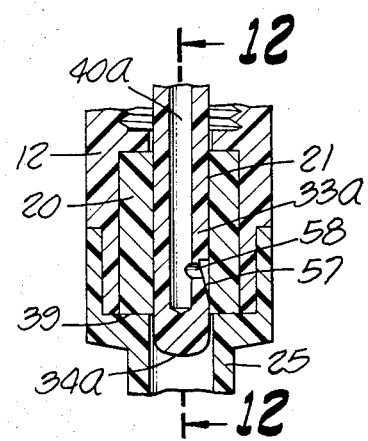
FIG. 11 is a sectional detail showing a modified form of the invention.
Figure 12:
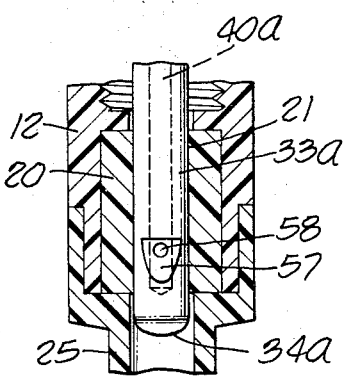
FIG. 12 is a sectional view taken substantially on the lines 12—12 as shown in FIG. 11.

In the modified form of the invention shown in FIGS. 11 and 12, the thin axial slot is replaced by an inclined flat surface 57 on the outer cylindrical portion of the projection 33a. This flat surface 57 merges with the cylindrical surface of the projection at a point spaced from the lower end 34a of the projection. The other end of the inclined flat surface 57 communicates through a small radial port hole 58 with the discharge passage 40a. The operation of this modified form of the device is the same as that previously described.

In a typical commercial embodiment of this invention, the piston 28 is formed of brass or aluminum, and the elastomeric sleeve 20 is formed of a fluorocarbon elastomer having a Shore hardness of 65–70. The diameter of the cylindrical piston 28 is about 0.008 inch to 0.010 inch larger than the normal free diameter of the bore 21.

Having fully described our invention, it is to be understood that we are not to be limited to the details herein set forth but that our invention is of the full scope of the appended claims.

We claim:

1. In combination: a fluid pressure can having walls provided with an aperture, a body fixed within the can and having walls defining an axial opening, an elastomeric sleeve capable of lateral distortion and fixed within the body and having a cylindrical bore communicating with said axial opening and said aperture, and a metallic cylindrical piston positioned within said cylindrical bore wholly between the ends of the elastomeric sleeve, and outer diameter of the piston being greater than the normal free diameter of said cylindrical bore, whereby the piston is resiliently gripped within the bore and seals the bore to prevent escape of fluid pressure from the can.

2. In combination: a pressure can containing LPG and having an end wall provided with an aperture, a tubular body fixed to the end wall and having walls defining an axial opening, an elastomeric sleeve capable of lateral distortion and fixed within the body and having a cylindrical bore communicating with said axial opening and said aperture, and a metallic cylindrical piston positioned within said bore wholly between the ends of the elastomeric sleeve, the outer diameter of the piston being greater than the normal free diameter of said bore but less than said axial opening in said tubular body, whereby under normal operating temperatures the piston is resiliently gripped within the bore and seals the bore to prevent escape of LPG, but is ejected axially from said bore and through said axial opening and aperture by excessive pressures within the can caused by abnormally high temperatures.

3. In combination: a pressure can having walls provided with an aperture, a body fixed within the can and having walls defining an axial opening, an elastomeric sleeve capable of lateral distortion and fixed within the body and having a cylindrical bore communicating with said axial opening and said aperture, a metallic cylindrical piston positioned within said bore wholly between the ends of the elastomeric sleeve to prevent escape of pressure from the can, the outer diameter of the piston being greater than the normal free diameter of said bore so that the piston is resilently gripped within the bore, and an outlet unit having a cylindrical projection insertable axially through said aperture and axial opening and into said bore to displace said piston axially from said bore, said cylindrical projection sealing within said bore.

4. In combination: a pressure can containing LPG and having an end wall provided with an aperture, a tubular body fixed to the end wall and having walls defining an axial opening, an elastomeric sleeve capable of lateral distortion and fixed within the body and having a cylindrical bore communicating with said axial opening and said aperture, a metallic cylindrical piston positioned within said bore wholly between the ends of the elastomeric sleeve and resiliently gripped within the bore to prevent escape of LPG through said aperture, the outer diameter of the piston being greater than the normal free diameter of said bore, and an outlet unit having a cylindrical projection insertable axially through said aperture and axial opening and into said bore to displace said piston axially from said bore, said cylindrical projection sealing within said bore.

5. In combination: a pressure can having walls provided with an aperture, a body fixed within the can and having walls defining an axial opening, and having internal threads, an elastomeric sleeve capable of lateral distortion and fixed within the body and having an axial cylindrical bore communicating with said axial opening and said aperture, a metallic cylindrical piston of greater diameter than the normal free diameter of said bore resiliently gripped within the bore wholly between the ends thereof and cooperating with the elastomeric sleeve to prevent escape of pressure through said body and aperture, an outlet unit having a portion insertable through said aperture and axial opening, said portion having external threads engageable with said internal threads and having a cylindrical projection movable into said bore to displace said piston axially from said bore, said cylindrical projection sealing within said bore.

6. The combination set forth in claim 5 in which said cylindrical projection contains a narrow axially extending sawcut near the projecting end thereof communicating with an axial discharge passage in said projection, the maximum length dimension of said sawcut being on the exterior surface of said projection.

7. The combination set forth in claim 5 in which said cylindrical projection has an inclined flat exterior surface near the projecting end thereof communicating with an axial discharge passage in said projection.

* * * * *